United States Patent [19]

Yang

[11] Patent Number: 5,352,931
[45] Date of Patent: Oct. 4, 1994

[54] MULTI-VOLTAGE CONTROL CIRCUIT OF TREE BRANCH NETWORK

[76] Inventor: Tai-Her Yang, 5-1 Taipin St., Si-Hu Town, Dzan-Hwa, Taiwan

[21] Appl. No.: 32,132

[22] Filed: Mar. 17, 1993

[30] Foreign Application Priority Data

Mar. 18, 1992 [GB] United Kingdom .............. 9205903.9

[51] Int. Cl.⁵ ................................................ H02J 1/00
[52] U.S. Cl. ........................................ 307/81; 307/63; 307/77
[58] Field of Search ........................ 307/43, 54, 61, 63, 307/77, 80, 81, 85; 323/283; 363/65, 71

[56] References Cited

U.S. PATENT DOCUMENTS

| | | | |
|---|---|---|---|
| 4,412,137 | 10/1983 | Hansen et al. | 307/10 R |
| 5,045,990 | 9/1991 | Stanley | 307/63 X |
| 5,121,046 | 6/1992 | McCullough | 320/16 |
| 5,187,396 | 2/1993 | Armstrong, II et al. | 307/85 X |

Primary Examiner—Steven L. Stephan
Assistant Examiner—Adolf Berhane
Attorney, Agent, or Firm—Leonard Bloom

[57] ABSTRACT

This design mainly is to provide a multi-output graded multi-voltage, and further to connect with linear or chopped wave solid switch members so as to attain non-sparkle multi-voltage switching and graded voltage combining with linear voltage adjustment, or low ripple-wave PWM voltage output of graded voltage combining with chopped wave voltage adjustment, and by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or the slowly voltage-rising or slowly voltage-dropping output which forms between valley bottom voltage and peak and is controlled by adjustable linear, or PWM of it, and outputs the adjusting function by means of further feedback of limited current, or constant current and set voltage.

1 Claim, 4 Drawing Sheets

MULTI-VOLTAGE CONTROL CIRCUIT OF TREE BRANCH NETWORK

SUMMARY OF THE INVENTION

Because battery is portable and mobile, it is widely used for various kinds of appliances, such as electric vehicles, etc. But the kind of storage, or fuel, or thermal, or sun-power battery has physical basic voltage. Generally speaking, we shall choose its voltage and capacity by means of its multiple series and supply it in accordance with the need of load by means of graded voltage, or control it by serial linear members, or operate it by chopped wave switches. This is an efficient circuit design mainly to provide a multi-output graded multi-voltage, and further to connect with linear or chopped wave solid switch members so as to attain non-sparkle multi-voltage switching and graded voltage combining with linear voltage adjustment, or low ripple-wave PWM voltage output of graded voltage combining with chopped wave voltage adjustment. And "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or the slowly voltage-rising or slowly voltage-dropping output which forms between valley bottom voltage and peak and is controlled by adjustable linear, or PWM of it", and outputs the adjusting function by means of further feedback of limited current, or constant current and set voltage.

DETAILED DESCRIPTION OF THE INVENTION

Serialized multi-voltage circuit consists of two sets or more than two sets of battery units of same voltage, same capacity, or at least of same voltage, and by means of branch connected switches to switch on/off and change their serialized and multiplized situation so as to further change their output voltage; when outputting, it will make switch contact multiple series connect to segmented diode's two ends so as to eliminate diode's direct voltage reducing and thermal loss, and it can further combine with current inspection device and linear or switch-mode solid switch member, and combine with a central control unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side.

Figure 1:
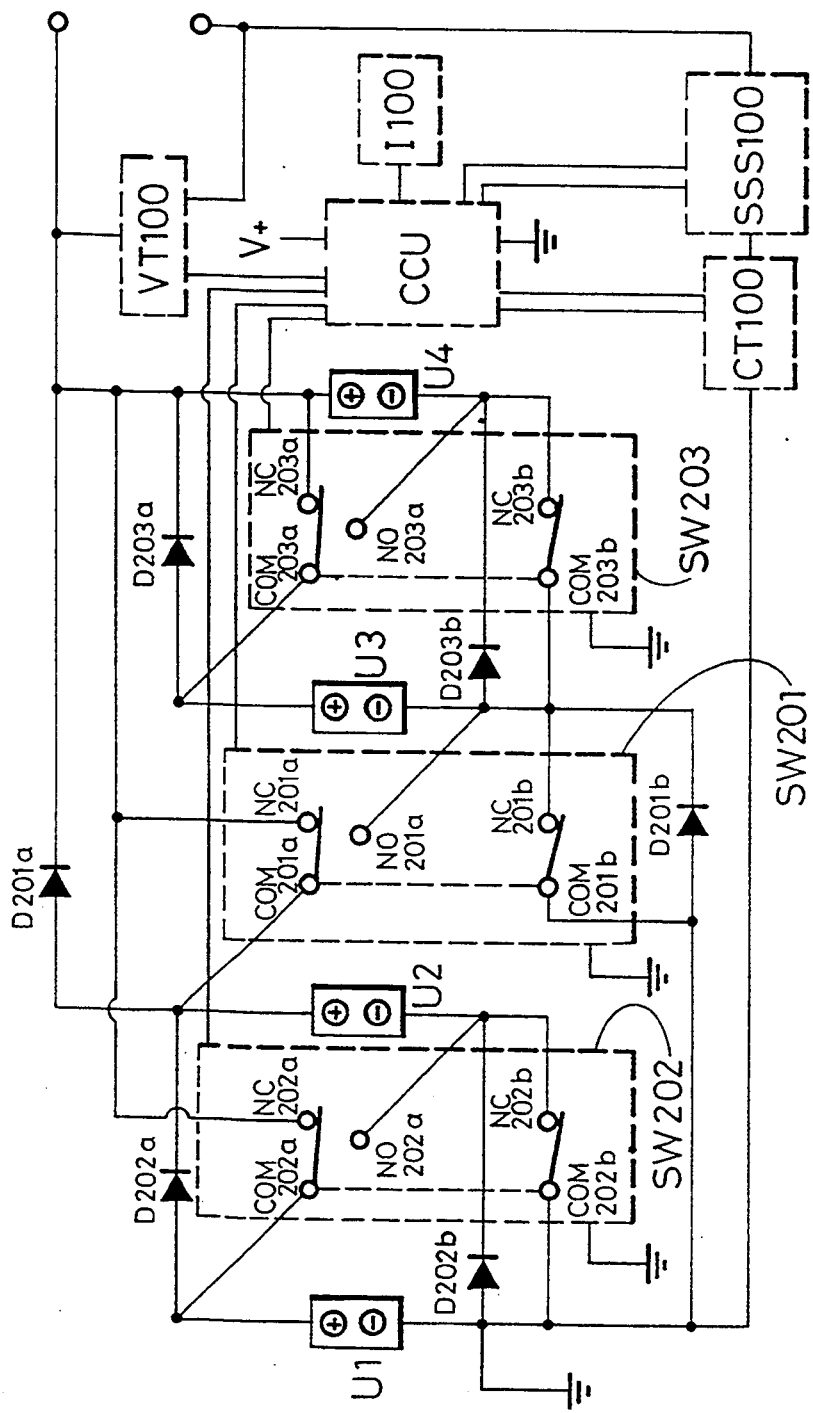
FIG. 1 is a view of multi-voltage circuit composed of branch switch circuit and serial diode.
Figure 2:
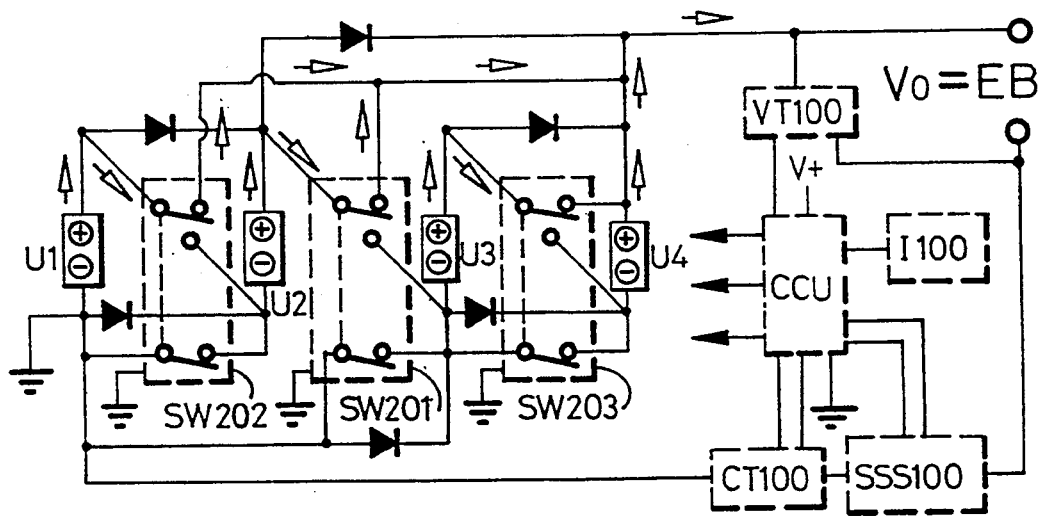
FIG. 2 is a view of low voltage switch circuit of FIG. 1.

The embodiment in FIG. 1 consists of:

Positive pole of first battery unit U1 and serialized first switch SW202 have common contact COM202a, after mutually contacted, they directly serialize first diode D202a, and then connect with the positive pole of second battery unit U2, and common contact COM201a of serialized second switch SW201, and then further directly serialize with third diode D201a, and then connect to output positive pole;

Negative pole of battery unit U1 connects to output negative end and serialized switch SW202 of the common contact COM202b, and then directly serialized second diode D202b; the output positive end of diode D202b further connects to the open No. 202a of switch SW202 and close NC 202b, when common connected to pass to negative of U2;

Negative end of battery unit U1 connects to serialize the common contact COM201b of switch SW201, and then directly serialize fourth diode D201b, the output positive end of diode D201b connects to close contact NC 201b of SW201 and open NO201a and common contact COM203b of serialized switch SW203 and the negative pole of third battery unit U3; and then directly serialize sixth diode D203b; the output positive end of diode D203b connects to close contact NC203b of third switch SW203 and the negative pole of fourth battery unit U4;

After the positive pole of battery U3 connects with common contact COM203a of serialized switch SW203, they directly connect to serialized fifth diode D203a; the output positive end of diode D203a connects with close contact NC203a of serialized switch SW203 and the positive pole of battery unit U4, and connects to output positive end;

Close contact NC202a of serialized switch SW202 and close contact NC201a of serialized switch SW201 are connected to output positive end;

Said circuit control has the following characteristics:
1. When SW201, SW202, SW 203 do not operate, battery unit U1–U4 connect with switch contact and tend to output low voltage of multiple; that is , 1×battery unit voltage, as shown in FIG. 2, which is partly a circuit view of low voltage output situation in FIG. 1.

Figure 3:
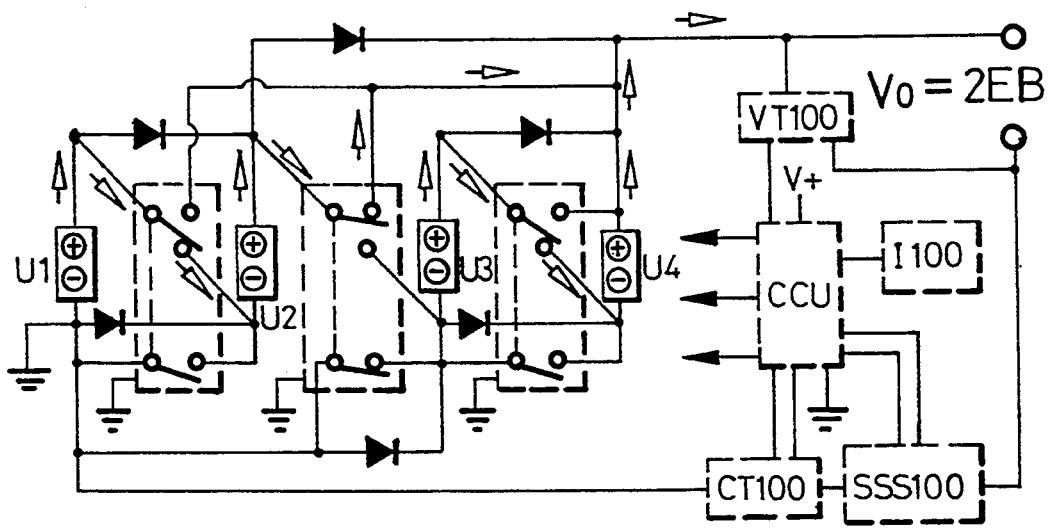
FIG. 3 is a view of intermediate voltage switch circuit of FIG. 1.
Figure 4:
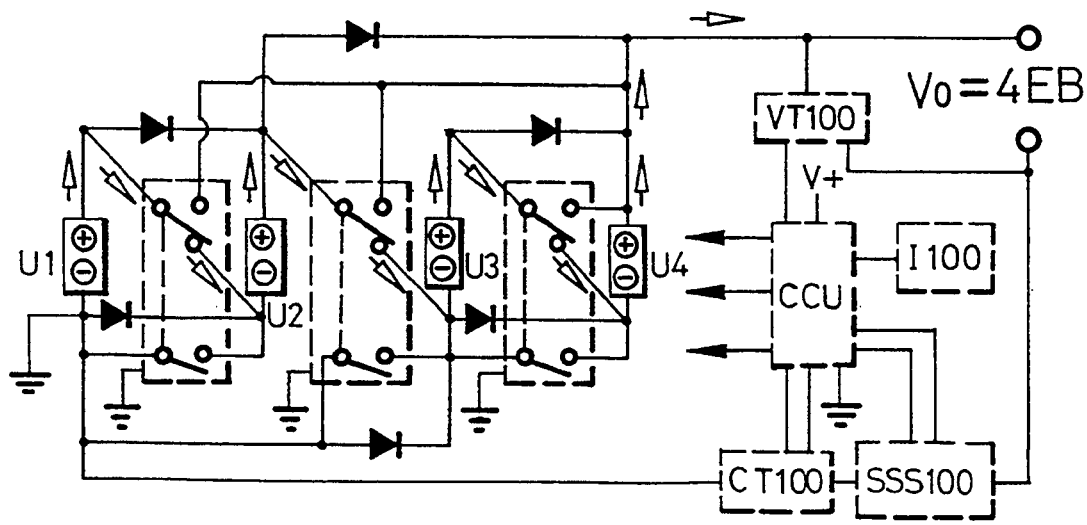
FIG. 4 is a view of high voltage switch circuit of FIG 1.

2. When SW202, SW 203 are in operation, battery unit U1 serializes with U2, U3 serializes with U4, and then these two are multiplized to output voltage of twice (2×) battery unit voltage, as shown in FIG. 3, which is a view of output circuit situation of circuit 2'× battery voltage in FIG. 1.
3. When SW201, SW202, SW203 are in operation, battery unit U1–U4 are serialized so as to output voltage of (4×) battery unit voltage, FIG. 4 is a view of output circuit situation of circuit (4×) battery voltage in FIG. 1.

By means of the said circuit in the embodiment, we can use common divisor to make an analog and promote it. One of the characteristics of this circuit is to conduct the multiple devices for diode and contact, to produce sparkle of switching voltage potential differences at two ends of contact grades when contact is switche, and to eliminate diode to directly drop voltage and heat loss.

Figure 5:
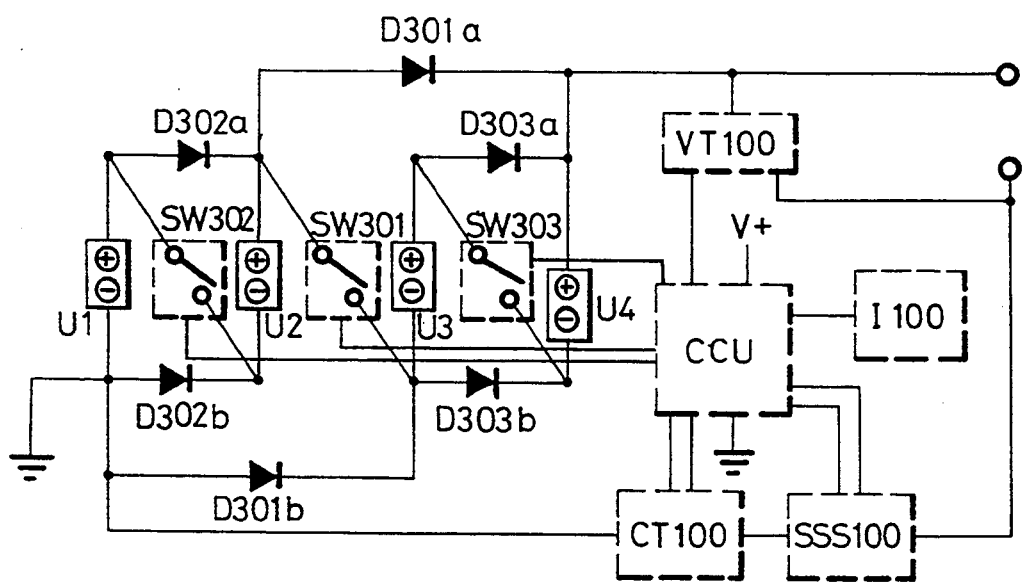
FIG. 5 is a view of multi-voltage switch circuit of single-throw switch combining with diode.

FIG. 5 is a view of multi-voltage switch circuit of single-throw switch combining with diode, and it can further combine with current inspection device and linear or switch-mode solid switch member, and combine with a central control unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side; in this embodiment, circuit shown in FIG. 1 combines with current inspection device and linear, switching, solid switch member and combines with a central control unit CCU, and changes SW201, SW202, SW203 into single-polar open switch and multiples respectively from SW301 to the positive pole of battery unit U1 and negative pole of U2, from SW303 multiple connecting to positive pole of U3 and negative pole of U4 of battery unit; diodes D301a, D301b, D302a, D302b, D303a, D303b are the same as the connecting line in FIG. 1, except the serialized switch can not eliminate the direct drop voltage of diode, all other functions are also the same as the circuit shown in FIG 1.

We can further use linear and switching solid switch member SW401, SW402, SW403, to replace said switch SW301, SW302, SW303.

Figure 6:
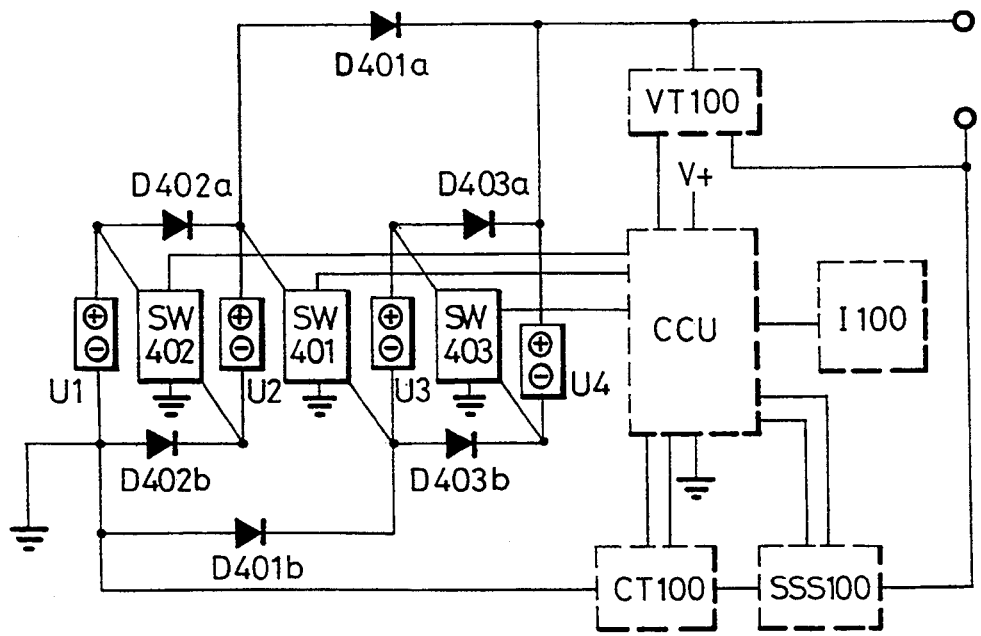
FIG. 6 is a view of multi-voltage switch circuit composed of solid switch member.

Referring to FIG. 6, a view of multi-voltage switch circuit composed of solid switch member, the disposition and function of diodes D401a, D401b, D402a, D402b, D403a, D403b are the same as the circuit in FIG. 1 and FIG. 5, the switch function of this circuit is the same as that in FIG. 5.

The embodiments in FIG. 1–FIG. 6 are battery units which have many advantages. For example, their control over the circuits is suitable for multi-voltage control of multiple independent DC power of alternate and commutation, elimination of sparkles, and constant adjustment between feedback control and linear or chopped wave graded voltage of voltage and current; in application, individual and independent DC voltage unit can be considered and used as a battery unit.

According to each said application theory, in practical uses, switch member between each battery unit can also use electric-mechanic switch and solid switch member in accordance with needed function and economy.

Figure 7:
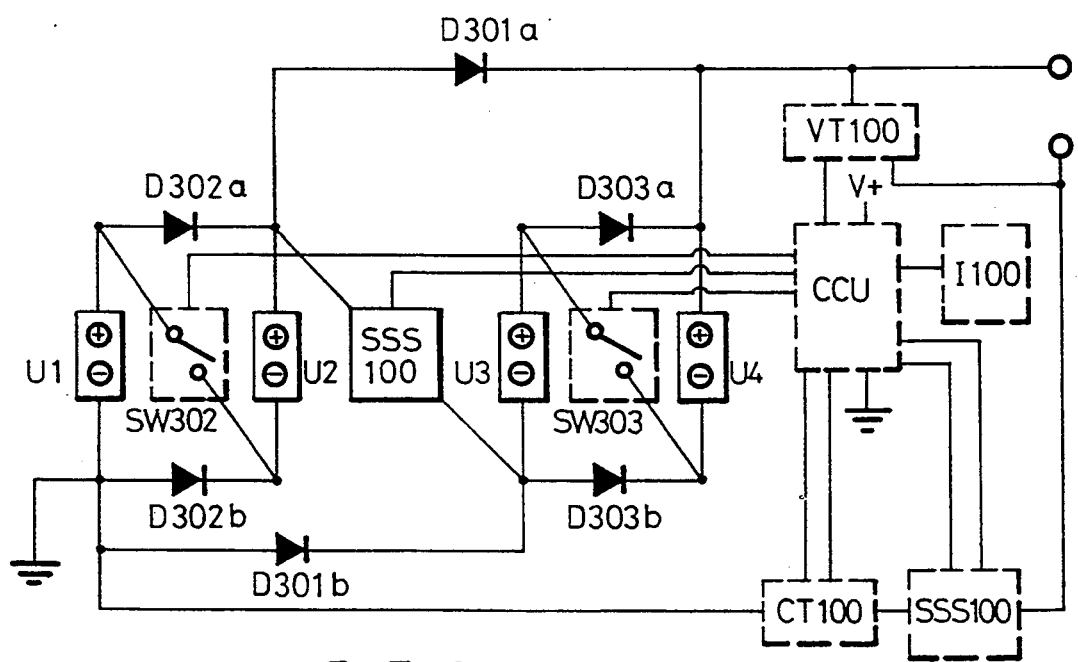
FIG. 7 is an economy circuit embodiment which has a linear or chopped wave adjustment function when it is beyond basic voltage.

FIG. 7, an economy circuit embodiment which has a linear or chopped wave adjustment function when it is beyond basic voltage, is an embodiment of extension of FIG. 5. Switch SW301 in FIG. 5 is replaced by the solid switch elements sss100 so as to adjust linear or chopped wave voltage. Other functions are the same as those in FIG. 5. And it further controls the polar exchanging period and the relation between the value of output voltage of multiple voltage in each half period.

In conclusion, object of the present invention is to provide an effective newly designed circuit which can output graded multi-voltage, and further combine with linear or chopped solid switch member so as to attain non-sparkle multi-voltage switching and low ripple-wave PWM voltage output of graded linear or chopped wave and further feedback the limited current or set voltage output adjustment function; it is so unique, newly designed, and practical, please examine it in accordance with the law.

I claim:

1. A multi-voltage battery circuit, comprising at least four batteries of substantially equal voltage and including first, second, third and fourth batteries, respectively, each of the batteries having a substantially equal terminal voltage and each of the batteries having respective positive and negative terminals, a plurality of switches including a first switch between the first and second batteries, a second switch between the second and third batteries, and a third switch between the third and fourth batteries, respectively, each of the switches having first and second common contacts, first and second normally closed contacts, and a normally open contact, respectively, such that when each switch is actuated, the respective normally closed contacts are opened, and such that the respective first common contact is connected to the respective normally open contact, a plurality of diodes including first, second, third, fourth, fifth and sixth diodes, respectively, each of the diodes having respective positive and negative terminals, a pair of output terminals including a positive output terminal and a negative output terminal, respectively, means for connecting the positive terminal of the first battery to the first common contact of the first switch and to the negative terminal of the first diode, respectively, means for connecting the negative terminal of the first battery to the negative terminal of the second diode, to the second common contact of the first switch, to the second common contact of the second switch, to the negative terminal of the fourth diode, and to the common output terminal, respectively, means for connecting the positive terminal of the second battery to the positive terminal of the first diode, to the negative terminal of the third diode, and to the first common terminal of the second switch, respectively, means for connecting the negative terminal of the second battery to the normally open contact of the first switch, to the positive terminal of the second diode, and to the second normally, closed contact of the first switch, respectively, means for connecting the positive terminal of the third battery to the negative terminal of the fifth diode and to the common contact of the third switch, respectively, means for connecting the negative terminal of the third battery to the normally open contact of the second switch, to the negative terminal of the sixth diode, to the second normally closed contact of the second switch, to the second common contact of the third switch, and to the positive terminal of the fourth diode, respectively, means for connecting the positive terminal of the fourth battery to the first normally closed contact of the third switch, to the positive terminal of the fifth diode, to the first normally closed contact of the second switch, to the first normally closed contact of the first switch, to the positive output terminal of the third diode, and to the positive output terminal, respectively, means for connecting the negative terminal of the fourth battery to the normally open contact of the third switch, to the positive output terminal of the sixth diode, and to the second normally closed contact of the third switch, respectively; wherein in the normal position of the respective first, second and third switches, the respective first, second, third and fourth batteries are in parallel, and the voltage at the output terminals is the terminal voltage of each battery; wherein, when the first and third switches are actuated, the first and second batteries are connected in series, the third and fourth batteries are connected in series, the series-connected first and second batteries are in parallel with the series-connected third and fourth batteries, and the voltage at the output terminals is twice the terminal voltage of each battery; and wherein, when the first, second and third switches are actuated, the first, second, third and fourth batteries are all in series, and the voltage at the output terminals is four times the terminal voltage of each battery.

* * * * *